Jan. 1, 1935.  F. SWITZER  1,985,961
HAT HOLDER
Filed June 20, 1933
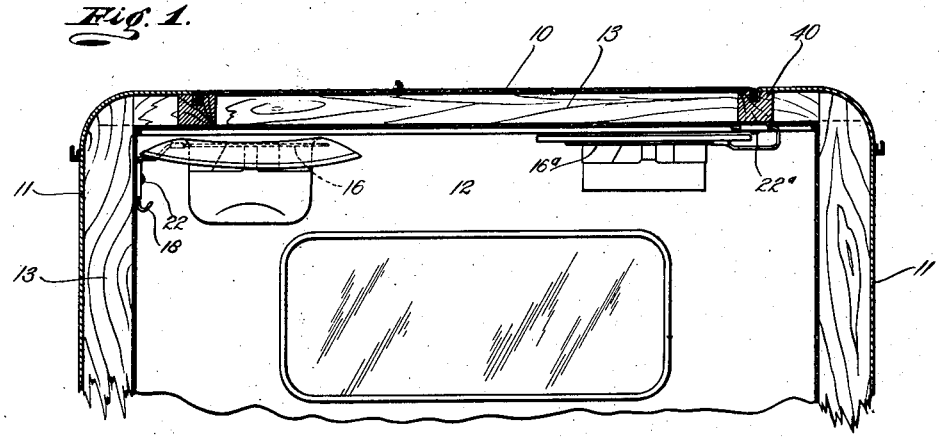
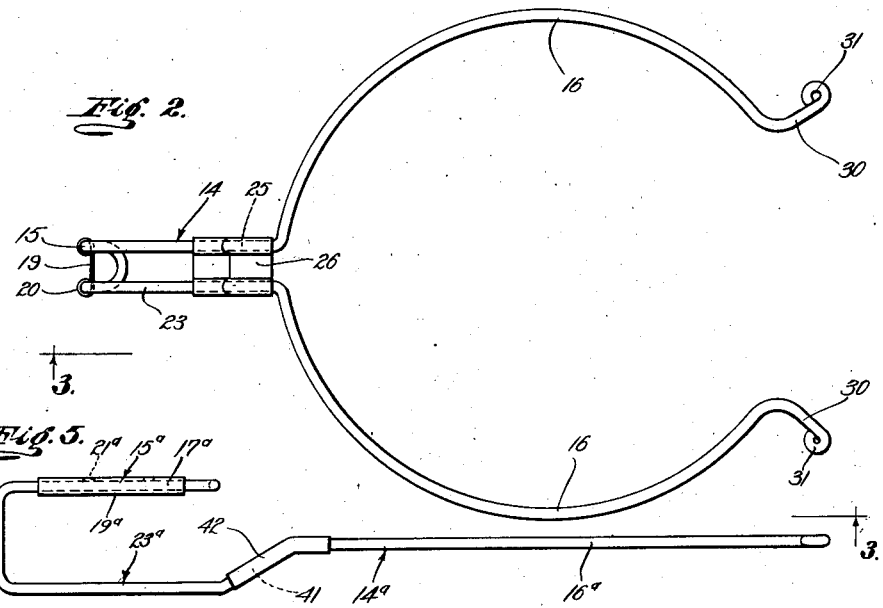
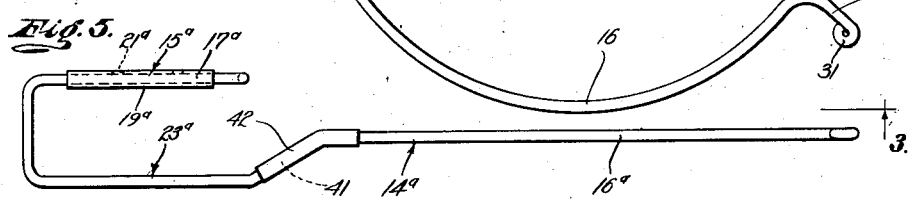
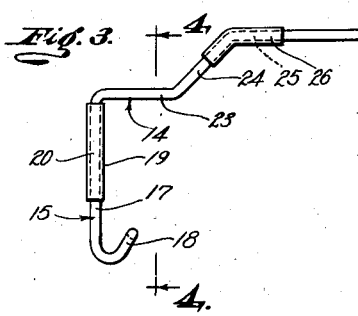
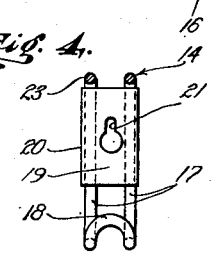
Inventor
Frank Switzer
By
His Attorney Patented Jan. 1, 1935

1,985,961

UNITED STATES PATENT OFFICE 1,985,961

HAT HOLDER

Frank Switzer, Inglewood, Calif.

Application June 20, 1933, Serial No. 676,652

2 Claims. (Cl. 211—32)

This invention relates to a hat holder and it is a general object of the invention to provide a simple, practical and improved device for holding hats. Another object of the invention is to provide a hat holder that is adapted for use or installation in various situations, for example, it may be installed in offices, various places of business, vehicles, such as automobiles, and the like, etc.

It is another object of the invention to provide a hat holder that is operable to effectively and dependabaly hold a hat without in any way crumpling or distorting it.

It is another object of the invention to provide a hat holder that is adapted to be mounted in confined or limited spaces, for example it may be mounted in the interior of an automobile on or adjacent its top and is such that a hat may be placed in and removed from the holder by horizontal movement only.

It is another object of the invention to provide a hat holder of the character mentioned that is compact and that embodies a minimum number of parts.

It is another object of the invention to provide a hat holder of the character mentioned that may be easily and quickly detached from its support.

It is a further object of the invention to provide a hat holder of the character mentioned that is particularly simple and inexpensive of manufacture.

Further objects and features of the invention will be better and fully understood from the following detailed description of typical forms and applications of the invention, throughout which description, reference is made to the accompanying drawing, in which:

Fig. 1 is a fragmentary vertical detailed sectional view of the upper portion of a vehicle body illustrating two typical embodiments of the invention mounted therein. Fig. 2 is an enlarged top or plan view of one form of hat holder. Fig. 3 is a side elevation of the device being a view taken as indicated by line 3—3 on Fig. 2. Fig. 4 is a vertical detailed sectional view, being a view taken as indicated by line 4—4 on Fig. 3 and Fig. 5 is an enlarged side elevation of the other form of the invention.

The hat holding devices provided by the present invention are adapted to be used in various situations, for example, they may be mounted on the wall or partition of a building, in closets, in the interiors of vehicles of various classes, etc. In the drawing I have illustrated typical embodiments of the invention detachably mounted on the interior of the body of an automobile or the like, it being understood that the invention is not to be construed as limited or restricted to any specific embodiment or application, but is to be taken as including any features or modifications that may fall within the scope of the claims.

Fig. 1 of the drawing illustrates the upper rear portion of an automobile body including a top 10, sides 11, and a rear side or back, 12. The body includes suitable wooden frame members 13 and its interior is finished or upholstered in the usual manner.

The form of the invention illustrated in detail in Figs. 2, 3, and 4 of the drawing includes generally, a body 14 having a base or mounting portion 15, and projecting arms 16 for carrying or holding a hat.

It is a feature of the invention that the body 14 is a simple member formed of a continuous or integral length of wire. The wire of which the body 14 is constructed is of suitable gage so as to be sufficiently rigid and yet be more or less flexible or resilient. If desired, the body 14 may be plated or painted. The base or mounting portion 15 of the body 14 is adapted to be attached to a vertical support and consists of two vertical parts 17. The vertical parts 17 of the wire body 14 are spaced apart and are parallel. The lower ends of the parts 17 are integrally joined or connected by an outwardly and upwardly projecting connecting portion 18, which is in the nature of a hook. The hook portion 18 is adapted to carry or suspend a garment, for example, a coat, or the like.

A mounting strap or plate 19 of sheet metal extends between and connects the vertical parts 17. The plate 19 is rectangular and its vertical edge portions 20 are rolled or wrapped about the vertical body parts 17. The plate 19 prevents the vertical body parts 17 from flexing or springing apart and facilitates the attachment of the device to a wall or support. An opening 21 is provided in the mounting plate 19 to pass or cooperate with a screw or the like, for attaching the hat holder to its support. In accordance with the preferred embodiment of the invention the lower end portion of the opening 21 is enlarged so as to pass the head of a screw or bolt so that the hat holder may be easily and quickly attached to and removed from its support. In the left hand portion of Fig. 1 of the drawing, I have illustrated the hat holder attached to or mounted on the interior of the vehicle body by a screw or bolt 22. The screw or bolt 22 may be connected to a suitable part of the vehicle body, for example, one of the vertical frame members 13, and projects from the interior of the vehicle so that it may be effectively received by the opening 21 of the mounting plate 19. It will be apparent how the hat holder may be easily and quickly positioned so that the screw or bolt 22 passes through the opening 21 whereby the head of the screw or bolt engages the forward face of the mounting plate 19 to secure the hat holder to the interior of the vehicle body. The forward face of the mounting plate 19 provides a readily visible surface that may carry advertising matter, or the like.

The arms 16 of the body 14 are provided to support or hold a hat and are horizontal, forwardly projecting members or parts. The body 14 formed of the integral or continuous length of wire includes connecting portions 23 which connect or join the hat holding arms 16 with the upper ends of the vertical parts 17. The connecting portions 23 of the body 14 are integrally joined with the upper ends of the parts 17 and project outwardly or forwardly as illustrated throughout the drawing. It is an important feature of the invention that the connecting portions 23 of the body 14 are shaped so that the brim of the hat is not distorted when the hat is supported in an inverted position by the arms 16. The connecting portions 23 project horizontally forward from the upper ends of the vertical parts 17 and then extend upwardly and forwardly as at 24, and then extend horizontally forward as at 25. This stepped configuration of the connecting portions 23 allows the brim of the hat to hang or curve downwardly without being bent or distorted when the hat is held inverted by the arms 16.

A strap or band 26 may extend between the horizontal outer ends 25 of the connecting portions 23. The band 26 is bent to extend between and connect the inclined parts of the portions 23 as clearly illustrated in Fig. 3. The ends of the band 26 are wrapped or bent about the body parts to prevent separation and/or flexing of the connecting portions 23. The band 26 in being bent to connect the inclined parts is particularly rigid.

The arms 16 for holding or carrying the hat are integrally joined or connected with the outer ends 25 of the portions 23 and project horizontally forward or outward when the hat holder is mounted on a vertical support or wall. The arms 16 are bent or bowed outwardly and forwardly and then forwardly and inwardly so that they are adapted to extend or engage about the crown of a hat. The radii of curvature of the arms 16 and the spacing of the arms 16 are such that the arms are adapted to accommodate hats of different sizes, characters, shapes, etc. The outer end portions of the arms 16 are spaced a considerable distance apart as clearly illustrated in Fig. 2 of the drawing.

The extreme outer end parts 30 of the hat holding arms 16 extend forwardly and outwardly in opposite directions so as to effectively guide a hat between the arms 16 without injury to the hat. Loops or partial loops 31 may be provided on the outer ends of the parts 30. The arms 16 are flexible so that they spring or flex outwardly away from one another when the hat is slipped or passed horizontally between their outer end parts 30.

It is believed that the utility and practicability of the hat holder illustrated in detail in Figs. 2, 3 and 4 of the drawing will be readily understood from the foregoing detailed description. The device is adapted to be mounted on any suitable support and in any desired position. The mounting plate 19 provided with the opening 21 permits the ready and convenient attachment or detachment of the hat holder. When attached to a vertical support, for example, a wall or partition with considerable space above the arms 16, an inverted hat may be readily placed on the holder by passing its crown between the arms 16 whereby the arms 16 come into supporting engagement with the brim. The stepped or bent connecting portions 23 of the body 14 allow the brim of the hat to freely bend or curve downwardly in the usual manner without being in any way bent or distorted. In the event that the device is mounted in a position where there is very little space above the arms 16, for example mounted on the interior of a vehicle body adjacent the top, a hat may be easily and quickly positioned in the holder by passing it horizontally inward between the flaring portions 30 of the arms 16. As the arms 16 are flexible they readily spring apart upon the passage of an inverted hat horizontally inward between their outer portions 30. Due to the shape of the arms 16 and their outer portions 30, a hat thus arranged between the arms 16 is not in any way injured or distorted. The hat may be readily removed from the holder in the same manner, that is, it may be withdrawn horizontally outward to pass between the outer portions 30 of the arms 16. Due to the bowed or bent configuration of the arms 16, they effectively and dependably hold the hat so that it cannot possibly become displaced from the hat holder. It is to be noted that the hat holder provided by the present invention consists of a single main or principal one-piece body 14, formed of a continuous length of wire. The device is particularly inexpensive of manufacture and is sturdy and compact.

The form of the invention illustrated in Fig. 5 and in the right hand portion of Fig. 1 is adapted to be mounted on the under side of a horizontal support. The hat holder illustrated in Fig. 5 includes an integral body 14$^a$, comprising a base or mounting portion 15$^a$ and arms 16$^a$ for carrying the hat. The arms 16$^a$ may be identical with the arms 16 described above being operable to effectively carry an inverted hat.

The base or mounting portion 15$^a$ includes two spaced substantially parallel parts 17$^a$ integrally connected at which I will term their inner ends. The parts 17$^a$ are integral parts of the wire forming the body 14$^a$ and are substantially horizontal, being adapted to be attached to the under side of a horizontal support. The parts 17$^a$ are connected by a mounting plate 19$^a$ for facilitating the attachment of the device to a support. The edge portions of the plate 19$^a$ are bent or rolled over the parts 17$^a$ and the plate is provided with an opening 21$^a$ similar to the opening 21 described above. Fig. 1 of the drawing illustrates the base or mounting portion 15$^a$ attached to the ceiling of the car body by a screw 22$^a$ passed through the opening 21$^a$ and screwed into a horizontal frame member 40 of the top.

In accordance with the invention the mounting portion is connected with the arms 16$^a$ by connecting portions 23$^a$. The portions 23$^a$ integrally join the outer ends of the parts 17ª and extend downwardly therefrom and then substantially horizontally toward the arms 16ª. The horizontal parts of the portions 23ª are below the plane of the arms 16ª and are connected to the adjacent ends of the arms by inclined parts or stepped parts 41. A band 42 extends between and connects the inclined parts 41. In the preferred construction the band 42 is bent to extend between and connect both the inclined portions and the horizontal portions where they join the arms 16ª. The edge portions of the band 42 are bent or rolled over the parts 41. The band 42 is effective in connecting the parts 41 and in preventing undesired or excessive spreading of the arms 16ª. Due to the configuration of the connecting portions 23ª the brim of the inverted hat held by the arms 16ª is free to hang or bend down, if flexible, without being distorted, and the hat is suitably spaced from the ceiling of the vehicle body. The hat may be easily and quickly arranged on the arms 16ª and is easily removable from the arms 16ª. The device may be used in various situations and is effective in holding or carrying hats of various characters.

Having described only typical, preferred forms of my invention, I do not wish to limit myself to the specific details set forth, but wish to reserve to myself any changes or variations that may appear to those skilled in the art or fall within the scope of the following claims.

Having described my invention, I claim:

1. A hat holder of the character described including, a wire body having spaced vertical mounting portions, an upwardly and outwardly projecting hook portion integrally joining the lower ends of the mounting portions, spaced horizontal arms shaped to extend about the crown of a hat, and connecting portions integrally joining the arms with the upper ends of the mounting portions, and a strap extending between and connected to the connecting portions.

2. A hat holder of the character described including, a wire body having spaced vertical mounting portions, an upwardly and outwardly projecting hook portion integrally joining the lower ends of the mounting portions, spaced horizontal arms bowed outwardly so that they are adapted to extend about the crown of a hat, and connecting portions integrally joining the upper ends of the said vertical portions with the arms and offset upwardly adjacent their points of joinder with the arms, and a strap extending between and connected to the connecting portions where they are offset upwardly.

FRANK SWITZER.